(12) United States Patent
Savage et al.

(10) Patent No.: US 6,962,321 B1
(45) Date of Patent: Nov. 8, 2005

(54) FLUID COUPLING WITH ROTARY ACTUATION

(75) Inventors: Chester Savage, Irvine, CA (US); Mark Anderson, Mitcham (AU); Silvio Sandvoss, Murrieta, CA (US)

(73) Assignee: Scholle Corporation, Irvine, CA (US)

( * ) Notice: Subject to any disclaimer, the term of this patent is extended or adjusted under 35 U.S.C. 154(b) by 0 days.

(21) Appl. No.: 10/048,136

(22) PCT Filed: Jul. 23, 1999

(86) PCT No.: PCT/US99/16641
§ 371 (c)(1),
(2), (4) Date: Jul. 9, 2002

(87) PCT Pub. No.: WO01/07331
PCT Pub. Date: Feb. 1, 2001

(51) Int. Cl.$^7$ ................................. F16L 37/32
(52) U.S. Cl. ............... 251/149.6; 251/149.9; 137/614.04; 141/346
(58) Field of Search .......... 251/149.4, 149.6, 251/149.9; 137/614.03, 614.04, 614.06; 141/346, 349, 353; 222/501

(56) References Cited

U.S. PATENT DOCUMENTS

| | | | | |
|---|---|---|---|---|
| 2,254,997 A | * | 9/1941 | Fisher | 137/614.03 |
| 2,485,006 A | * | 10/1949 | Main, Jr. et al. | 137/614.03 |
| 2,931,668 A | | 4/1960 | Baley | |
| 4,380,310 A | * | 4/1983 | Schneiter et al. | 222/501 |
| 4,949,745 A | * | 8/1990 | McKeon | 137/614.03 |
| 5,004,013 A | * | 4/1991 | Beaston | 137/614.06 |
| 5,031,662 A | | 7/1991 | Roethel | |
| 5,445,186 A | | 8/1995 | Richter et al. | |
| 5,524,664 A | * | 6/1996 | Lin | 251/149.4 |

* cited by examiner

*Primary Examiner*—Eric Keasel
(74) *Attorney, Agent, or Firm*—King & Jovanovic, PLC

(57) ABSTRACT

A two-part coupling structure (22, 32) includes a male coupling part (32) and a female coupling part (22) which are mutually engageable to open fluid communication between the coupling parts (22, 32). For example, the coupling parts (22, 32) may be used to establish fluid communication between a container (12) and a conduit (14). The coupling parts (22, 32) are disengageable from one another to discontinue fluid communication between them, and also to close communication between ambient and each of the container (12) and the conduit (14). The male coupling part (32) includes a mounting structure (44a–44e) for supporting on the female coupling part (32), and also includes a guide structure (44) effective to guide a male probe portion (36) of the male coupling part (32) into engagement with the female coupling part (22). A rotary actuator member (34), preferably in the form of a handnut is included in the male coupling part (32), and is effective upon rotation of cause axial relative movement of the male probe portion (36) into or out of engagement with the female coupling part (22). A considerably lowered manual engagement and disengagement force is provided, along with increased convenience and ease of use for the coupling structure.

17 Claims, 10 Drawing Sheets

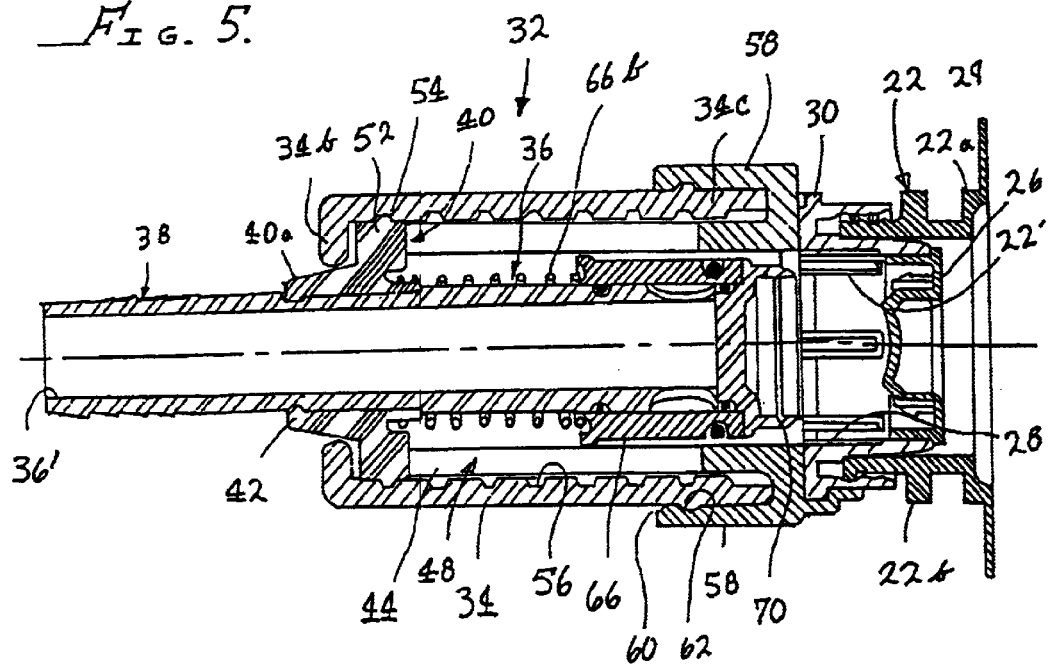
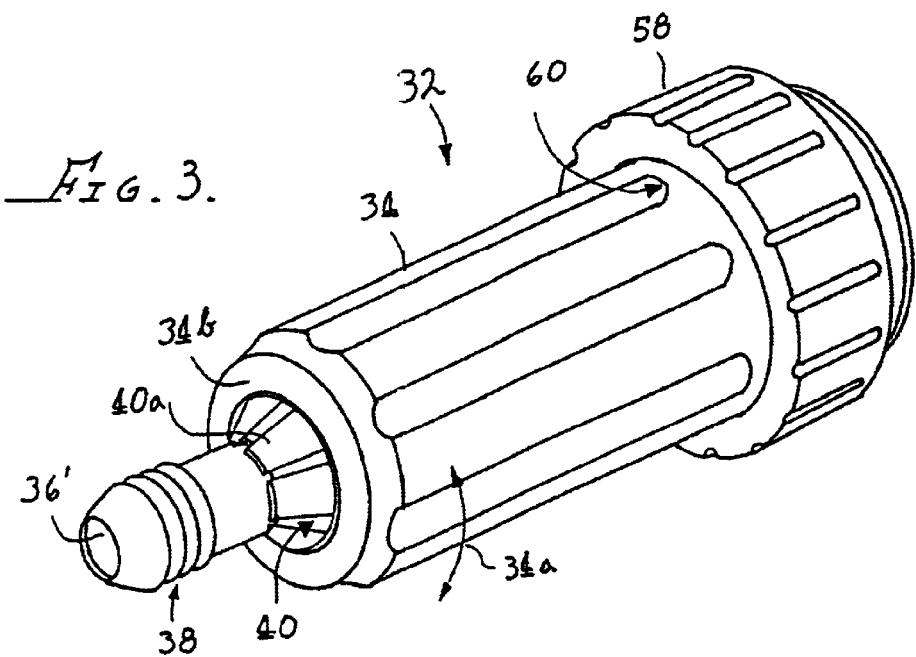

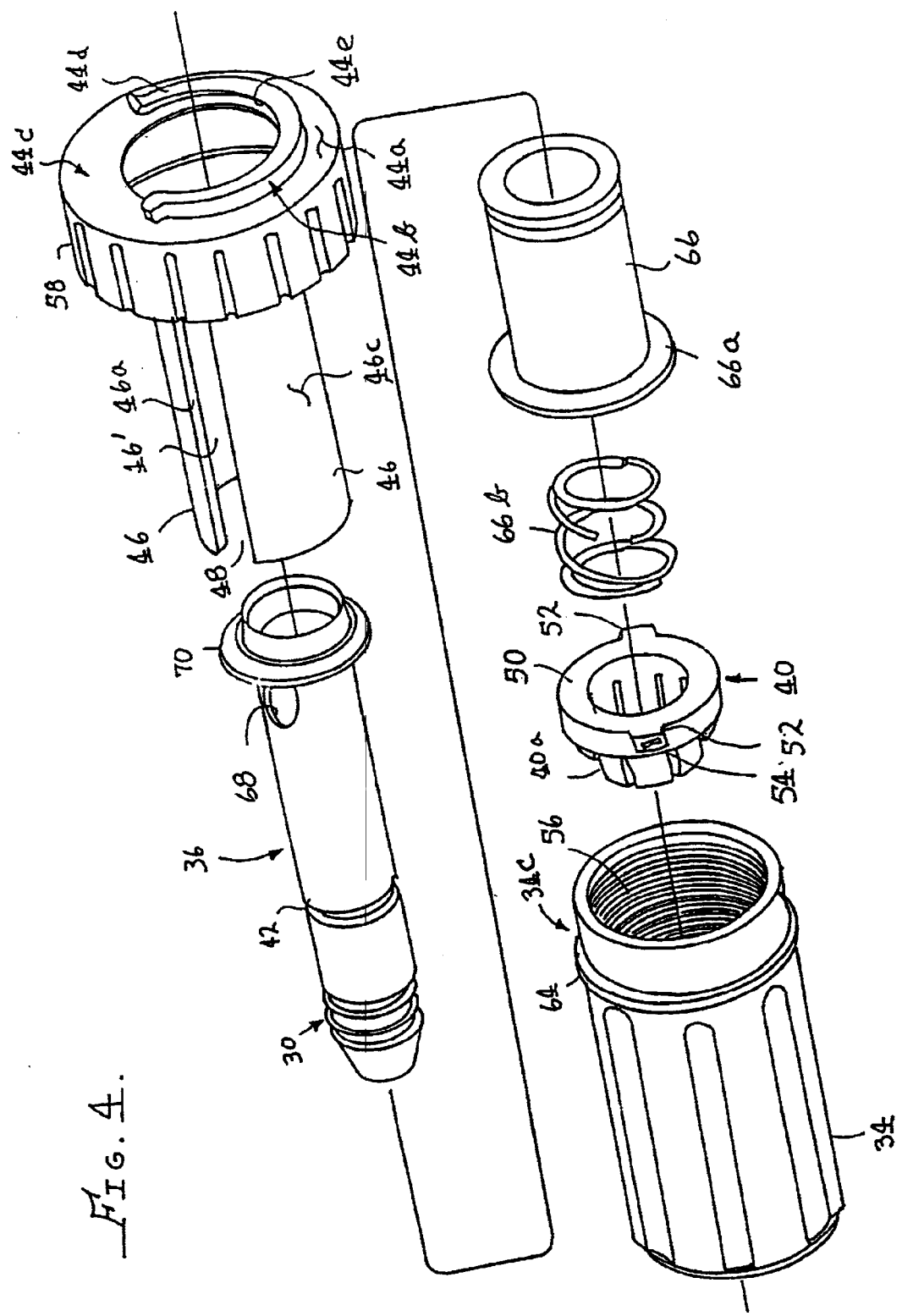

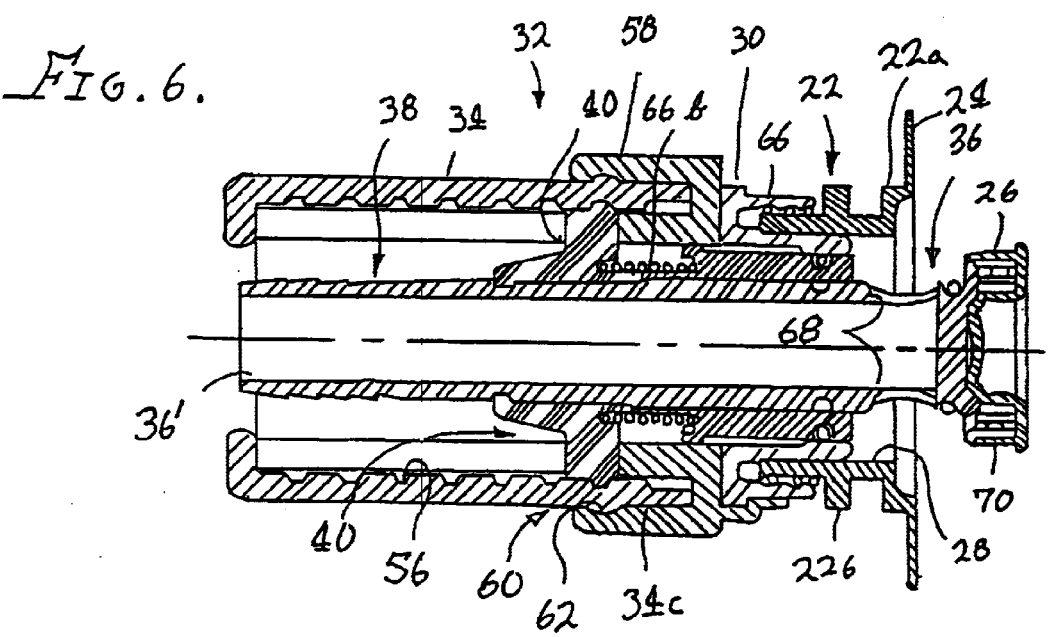

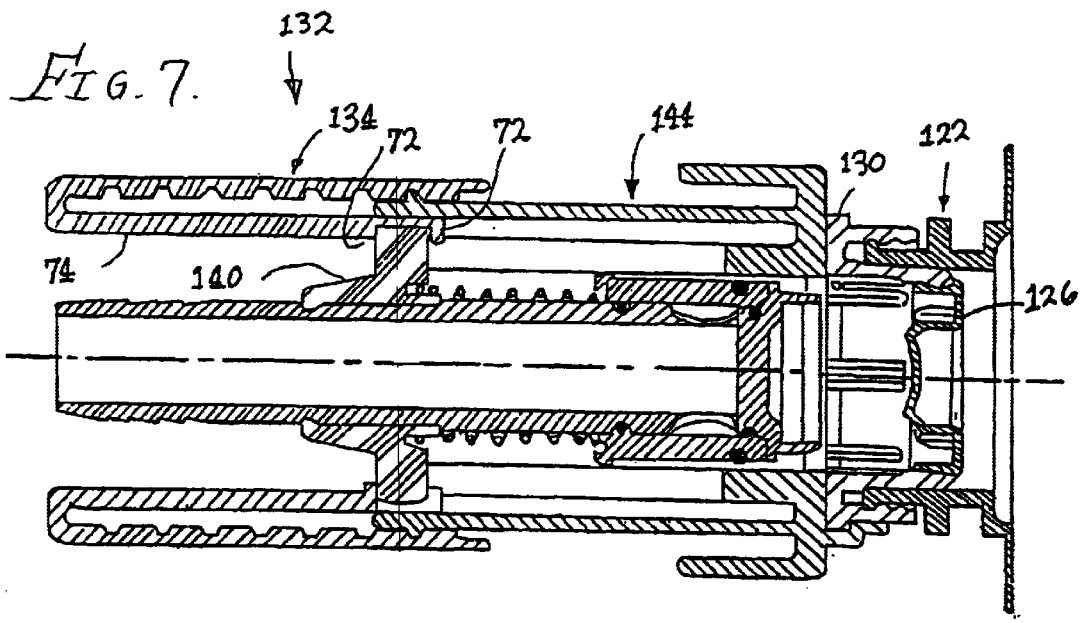
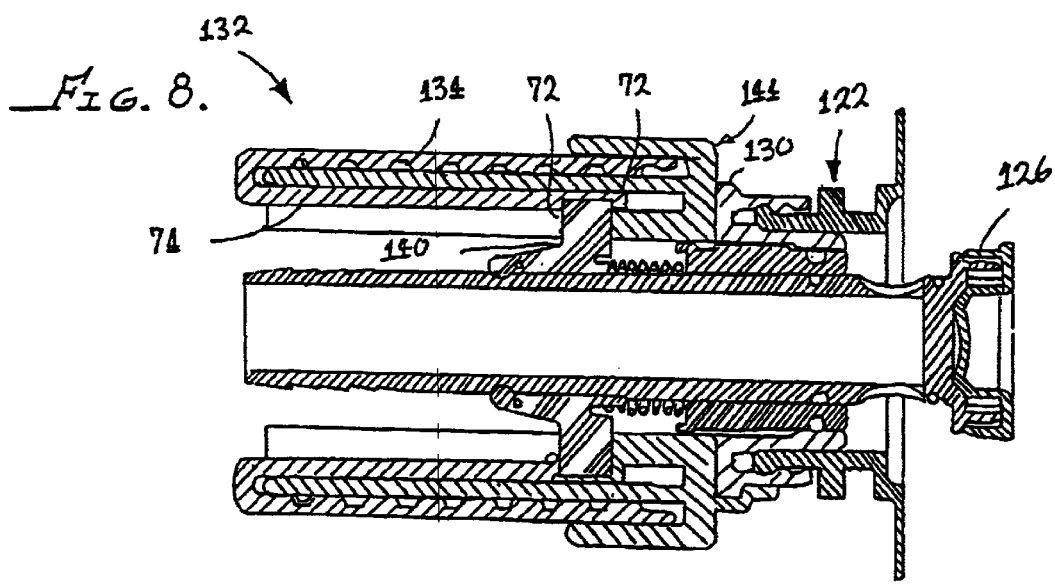

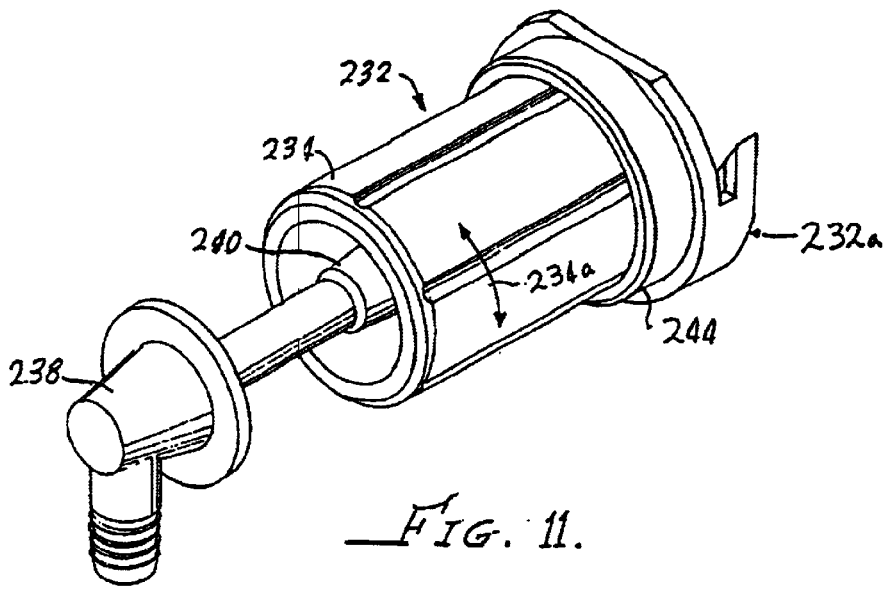
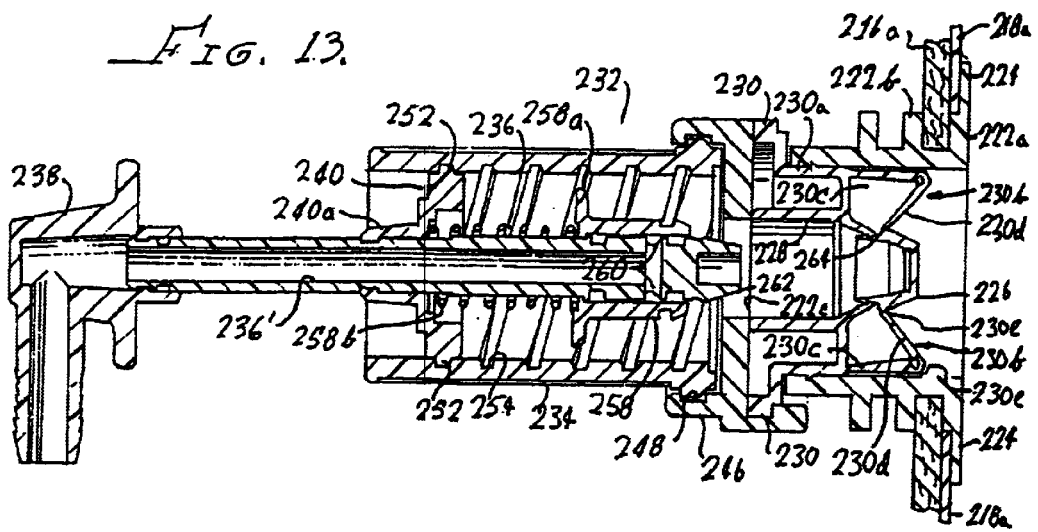

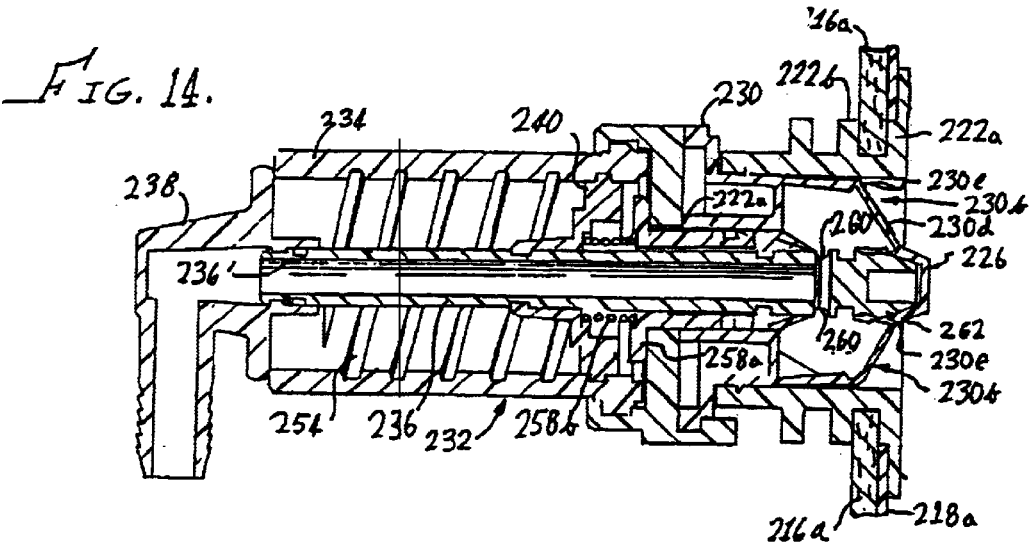
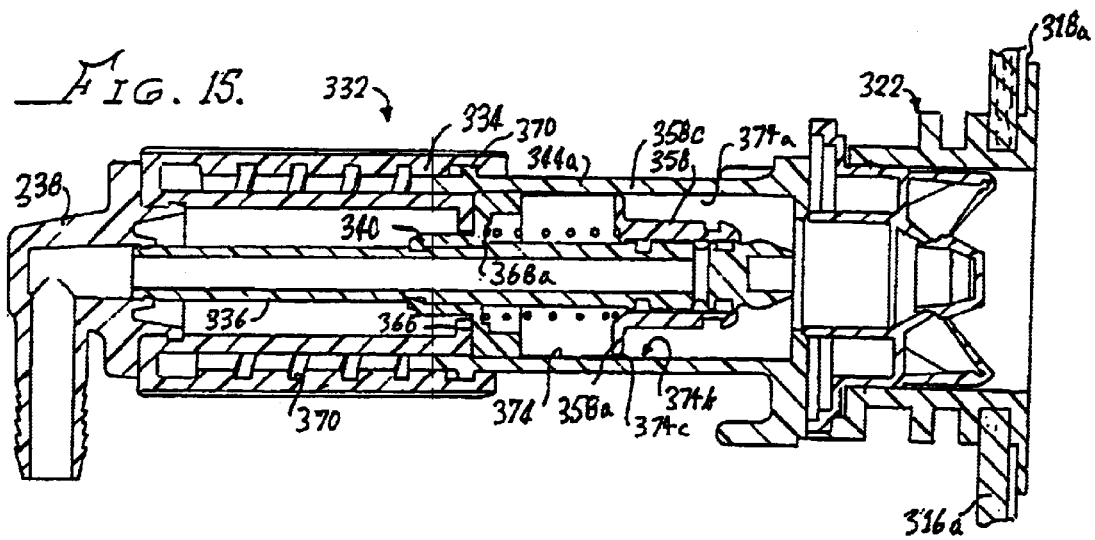
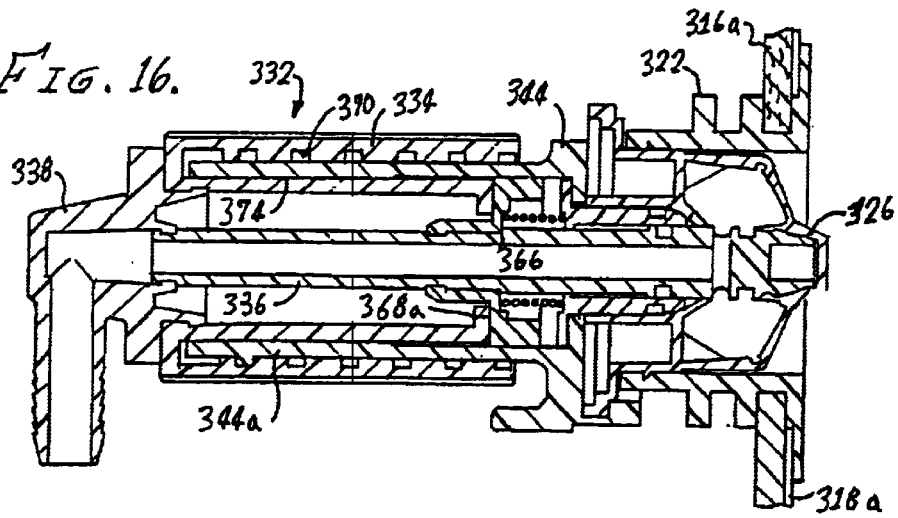

FLUID COUPLING WITH ROTARY ACTUATION

BACKGROUND OF THE INVENTION

1. Field of the Invention

The present invention is in the field of fluid-flow couplings which are generally characterized as being of the "dry break" type. More particularly, the present invention relates to fluid-flow couplings which include a first (or male) part, and a second (or female) part which when connected to one another effect fluid-flow communication therebetween. When the coupling parts are connected they may be used to effect fluid-flow communication between a vessel and a conduit, for example. When the coupling parts are disconnected they mutually reseal so that fluid is not lost either from the conduit or from the vessel. Further, the present invention relates to such couplings which additionally have a guide structure removably supporting on one of the coupling parts, and guiding the other coupling part reciprocally for engagement and disengagement with the one coupling part. Further the present invention relates to such couplings that utilize a rotary handnut in order to complete the coupling and uncoupling act, thus providing for a reduced level of manual force to be applied to the coupling.

2. Related Technology

A conventional coupling structure is known in accord with U.S. Pat. No. 4,421,146 (the '146 patent), issued 20 Dec. 1983 to Curtis J. Bond, et al. A coupling structure according to the '146 patent includes a tubular spout attached to and in fluid communication with a fluid filled vessel, such as a bag held within a cardboard box. This spout portion includes a plug member which is axially moveable between a first position closing fluid communication between the vessel and an outer portion of the spout member, and a second position opening this fluid communication. In the second position of the plug member a pair of lateral openings at an inner portion of the plug member are moved inwardly of the spout to permit fluid communication between the vessel and the outer portion of the spout.

A service member (i.e., the male coupling part) of the Bond '146 patent is carried in a guide structure which clamps to the spout and guides the service member for axial sliding engagement into sealing relation with the spout. The service member provides communication with a conduit, and includes a valve member closing communication between the conduit and ambient when the service member is disconnected from the spout. The service member as it engages the spout is also engageable with the plug member to move it between its two positions, and engagement between the service member and plug member opens the valve in the service member. Thus, when the service member is engaged into the spout, communication between the vessel and the conduit is established. Further, it is seen that the plug member of the Bond '146 patent carries an axial projection which contacts the valve member of the service member (the male coupling part), and opens this valve member.

The service member of the Bond '146 patent cannot be conveniently opened for cleaning, inspection, or replacement of the sealing member therein. It is true that the service member can be disassembled manually, but this service member contains many parts, and after the service member has been used to convey a food product, its disassembly is a messy job. Consequently, these conventional service members are sometimes discarded when a simple cleaning or replacement of an O-ring seal would allow their continued use. Again, however, because the service member according to the Bond '146 patent cannot be conveniently cleaned or fitted with a new O-ring, many users simply throw the fitting away and purchase a new one.

Another conventional coupling, which may be considered to be of hermaphrodite configuration, is known from European patent application No. 0 294 095 A1, published 7 Dec. 1988 (the '095 application). According to the '095 application, a "male" and "female" coupling parts are brought into alignment and juxtaposition by a yoke carried on a guide housing. The male coupling part is configured as a tubular member which is axially movable by a handle on the guide housing to engage with an annular valve member carried in the female coupling part. When the male and female coupling parts are coupled with one another (i.e., by extension of the male coupling part relative to the guide housing and into the female coupling part), an inner liquid extraction flow path is separated from an outer air-entrance (or pressurized gas delivery) flow path by the annular valve member of the female coupling. In the coupled condition of the male and female couplings, the annular valve member of the female coupling part also serves as a sealing member. A version of this coupling is also known in which the male coupling part carries a spring-loaded internal disk valve member which closes the liquid extraction flow path of the male coupling part when the male and female coupling parts are not coupled with one another.

Further, in a conventional coupling known in accord with U.S. Pat. No. 5,816,298, issued 6 Oct. 1998, and assigned to the same assignee at the present application. In this coupling structure two hands were required to push the sleeve of the male part up into the female part in order to disengage the plug of the female fitting and allow fluid flow through the male sleeve. In the '298 patent the coupling utilizes a pair of opposite ears, which protrude from oppose sides of the guide portion of the male coupling member. The purpose of these ears is to allow a user of the coupling to manually push the sleeve of the male coupling part axially into the female coupling part in order open both coupling parts and allow fluid flow through the engaged coupling parts. This engagement of the coupling parts required a two step process as is described below.

The conventional coupling according to the '298 patent employs a two part axial forward movement and a two part axial rearward movement. The first movement part begins with the sleeve of the male coupling part in a fully retracted position and ends when the sleeve makes contact with the cap of the female coupling part. This movement is accomplished by the user pushing on the ears of the male coupling part so that the sleeve moves in a forward toward the female part. This movement should require a minimal amount of force. The second movement part requires more force because the user is required to push the ears of the male coupling part until the sleeve disengages the plug in the female part from it's sealed position, and engages this plug onto the distal end of the male coupling part, thus allowing fluid flow through the engaged coupling parts. At this time a spring of the male coupling part is compressed and a latch on the male coupling part engages onto a ledge or flange of the female coupling part. This engagement of the latch locks the two coupling parts together, thus providing a secure engagement of the two coupling parts during fluid flow.

Disengagement of the conventional coupling according to the '298 patent is accomplished by unlatching the latch, and squeezing with the fingers on a rear flange of the guide portion of the male coupling part and the pair of ears. This action sequentially disengages the latch from the ledge or flange of the female coupling part, and subsequently allows the combination of spring force and manually applied force to both withdraw the male coupling part from within the female coupling part, and to push the sleeve of the male coupling part back to a sealing position so as to shut off fluid flow from the male coupling part. Withdrawal of the male coupling part also positions and engages the plug of the female coupling part once again into a sealing position. Thus, fluid flow through the disengaged coupling parts is prevented. In order to disengage the male coupling part from the female coupling part, a considerable manually applied force is required. In order to apply this manual withdrawal force, once again two bands are required, and are used to apply a balanced squeeze between the ears of the male coupling part and a flange at the rear of this coupling part in order to effect a withdrawal force on the probe portion of the male coupling part. This withdrawal force withdraws the male probe from the female coupling part, and also restores the plug of the female coupling part to a sealed position within the female coupling part.

SUMMARY OF THE INVENTION

In view of the deficiencies of the related technology, a need exists for a coupling structure which provides ease of use, and a general reduction in the amount of manual force required of a user when effecting engagement and disengagement of the coupling parts. That is, not only must a minimum of force be required on the part of a user, but also only a minimal engagement force is allowed to be transferred to a container carrying the female coupling part.

Still further, a need exists for such a coupling structure which is of low retained volume when the components of the coupling are disconnected from one another.

Additionally, a need can be seen to exist in view of the deficiencies of the related technology for such a coupling structure which allows the male coupling part to be opened for inspection, cleaning, and service (such as replacement of an O-ring sealing member) without the male coupling part being attached to a female coupling part.

An additional object for this invention is to provide a coupling structure which will function properly with a fluid having pieces, chunks, or particles in the fluid.

Accordingly the present invention provides a fluid coupling structure having a male coupling part defining a fluid flow path, the male coupling part being removably engageable with a female coupling part to open a mutual fluid flow path therethrough. The male coupling part includes an individual valve element having a respective closed first position, and this valve element moves to an opened second position in response to axial advancement of a male probe portion of the male coupling part to a forward position of potential engagement with a female coupling part. The male coupling part comprising: a guide structure reciprocally carrying the male probe portion between the closed first position and the opened second position. The guide structure including support means for being supported removably on a female coupling part, and further including means effective when the male coupling part is supported on the female coupling part for aligning and guiding the male probe portion in reciprocation between the closed first position and the opened second position engaged with a female coupling part. The guide structure carrying a rotational actuator member, which rotational actuator member and the male probe portion include cooperating means for reciprocating the male probe portion axially between the first and the second positions in response to rotation of the rotational actuator member.

According to another aspect, the present invention provides a male fluid coupling device for use in conjunction with a female fluid coupling device, said male fluid coupling device defining a fluid flow path, said male and female fluid coupling devices being removably engageable with one another to communicate the fluid flow path with another fluid flow path defined within said female coupling device, said male fluid coupling device including a male probe portion carried reciprocally within a guide structure supportable upon the female coupling device, said male coupling device also comprising a valve element on said male probe portion and having a closed first position and relatively moving to an open second position in response to reciprocation of said male probe portion relative to said guide structure, and a rotational actuator portion manually relatively rotational relative to said guide portion to move said male probe portion axially in reciprocation.

An advantage of the present invention is that the male coupling part can be opened for cleaning and inspection without the need to disassemble this male coupling part. Moreover, the male coupling part does not rely upon its being coupled with a female coupling part to effect this opening of the flow path through the male coupling part. Instead, relative axial movement of the guide structure and male coupling part precipitated by movement of the handnut, is effective to open the male coupling part.

Further, an advantage of the present invention resides in the ease of actuation of the male coupling part, which may be engaged with and disengaged from the female coupling part using only a minimal level of manual force. Thus, those having a relatively limited hand strength may nevertheless operate the present inventive coupling device without difficulty.

These and additional objects and advantages of the present invention will be apparent from a reading of the following detailed description of an exemplary preferred embodiment of the invention taken in conjunction with the appended drawing Figures, which are briefly described immediately below.

BRIEF DESCRIPTION OF THE DRAWING FIGURES

FIG. 1 provides a somewhat schematic view of a fluid dispensing system with a portion of a paperboard box part of the system broken away for clarity of illustration, and including a fluid-filled vessel (i.e., a bag-in-box container) connecting to a fluid conduit via a coupling structure embodying the invention;

FIG. 2 provides a fragmentary perspective view, partially in cross section, of a female coupling part carried on the container seen in FIG. 1;

FIG. 3 is a perspective view of the male coupling part seen in FIG. 1, and is presented at an enlarged size for clarity of illustration;

FIG. 4 provides an exploded perspective view of the male coupling part embodying the present invention;

FIG. 5 is a longitudinal cross sectional view of the male coupling member mounted to but not engaged with a female coupling member, with the female coupling member in its closed position;

FIG. 6 provides a fragmentary cross sectional view showing a male coupling part mounted to the female coupling part and engaged with this female coupling part so that both the male and female coupling parts are opened, and fluid may flow between these coupling parts;

FIG. 7 is similar to FIG. 5, and illustrates an alternative embodiment of a male coupling part mounted to but not engaged with a female coupling part;

FIG. 8 is similar to FIG. 6, and illustrates the alternative embodiment of the male coupling part coupled to a female coupling part so that both the male and female coupling part are opened and fluid may flow between these coupling part;

Figure 9:
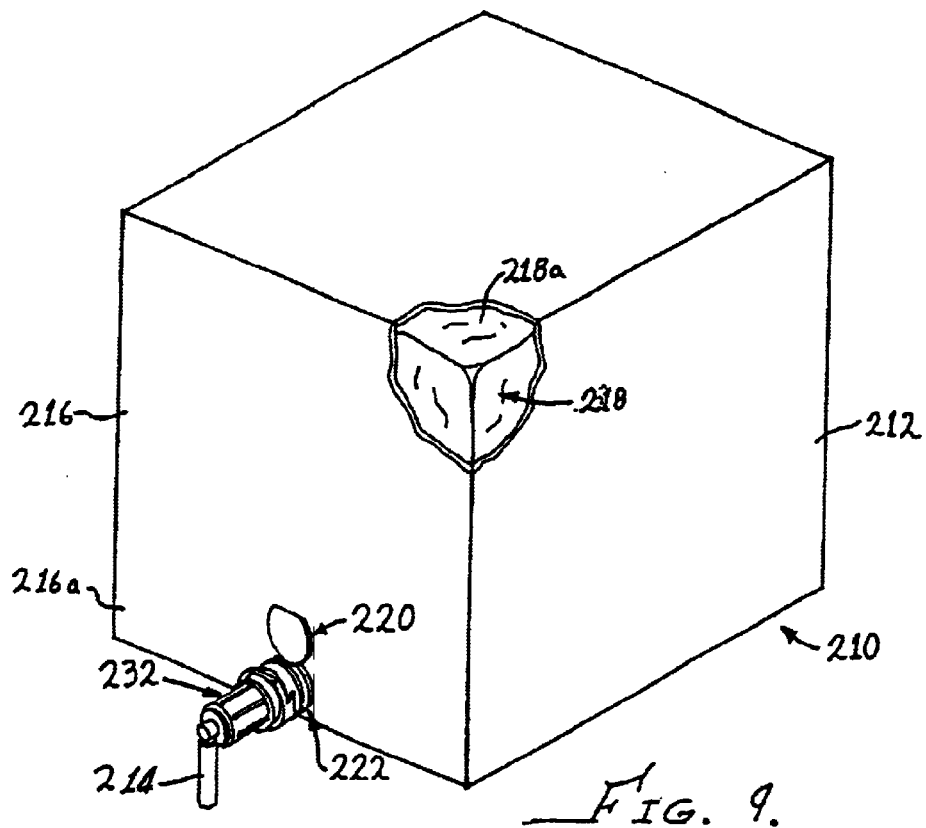
Figure 10:
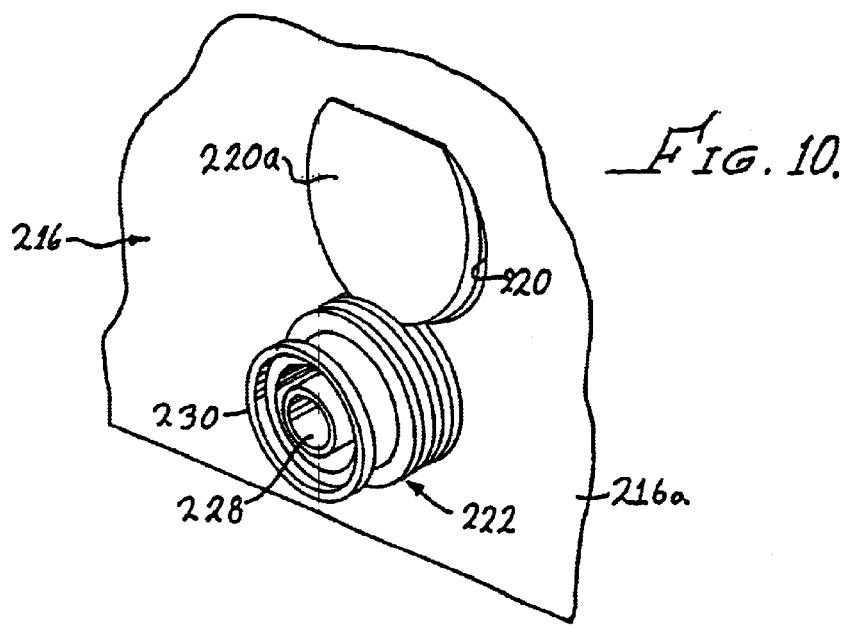
Figure 12:
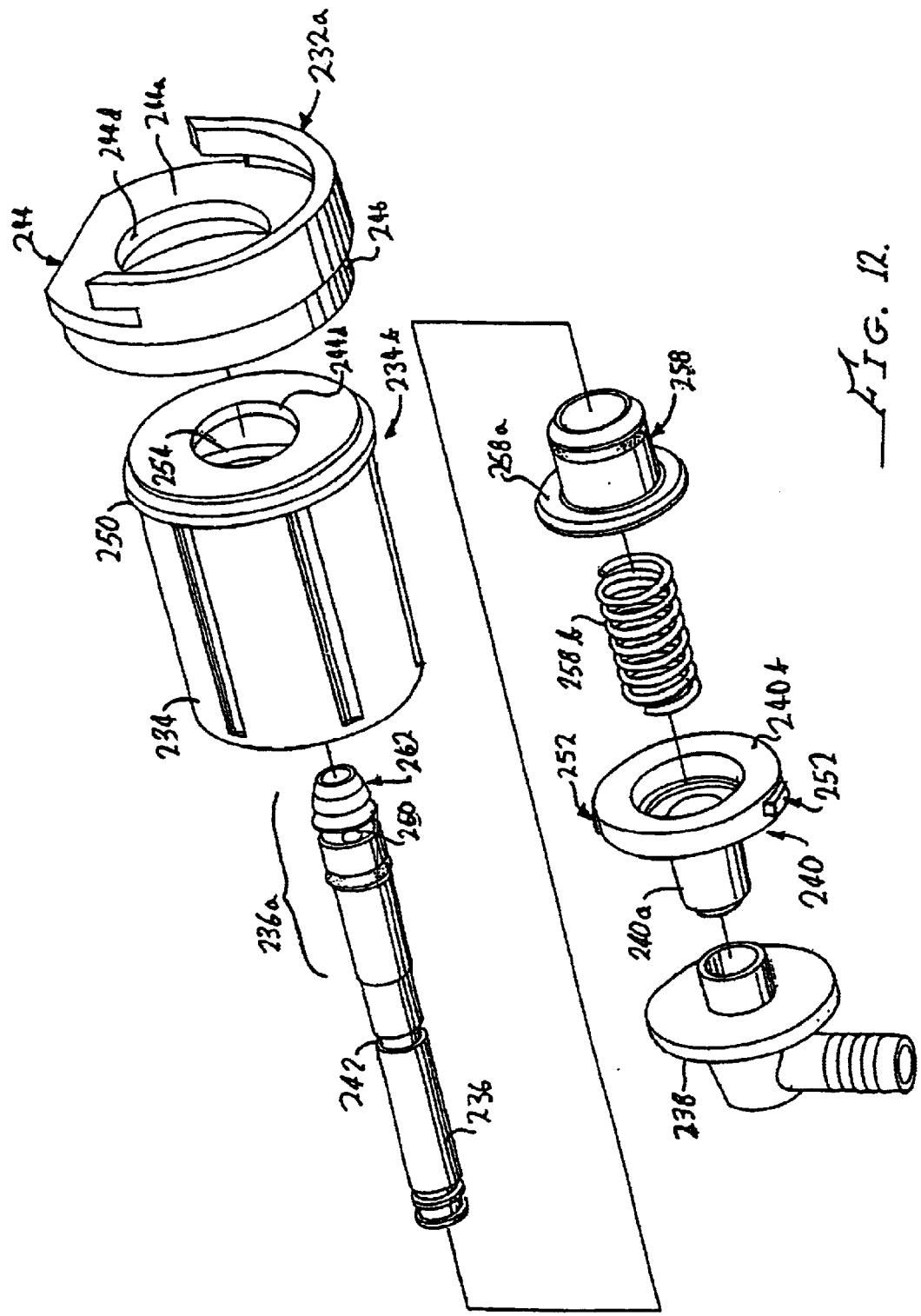
Figure 18:
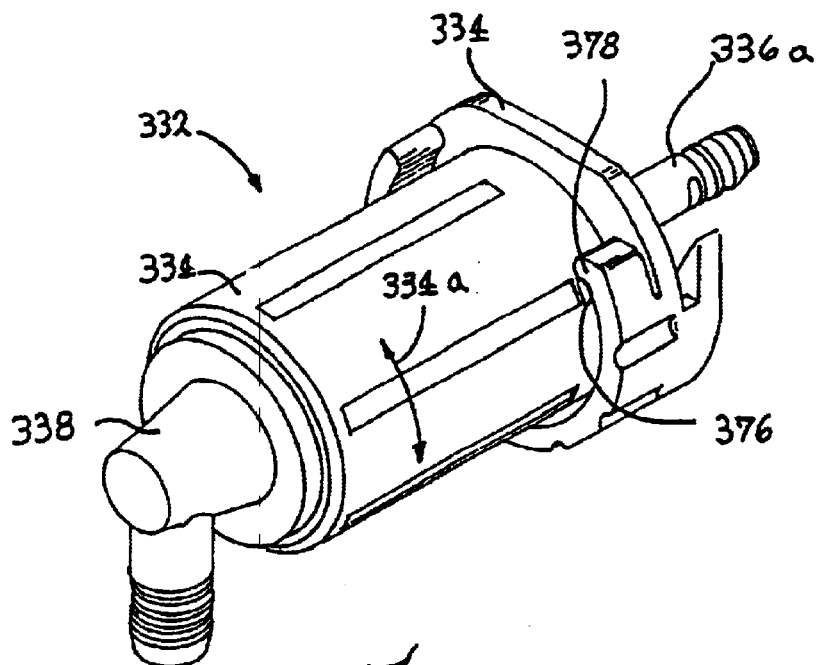
Figure 17:
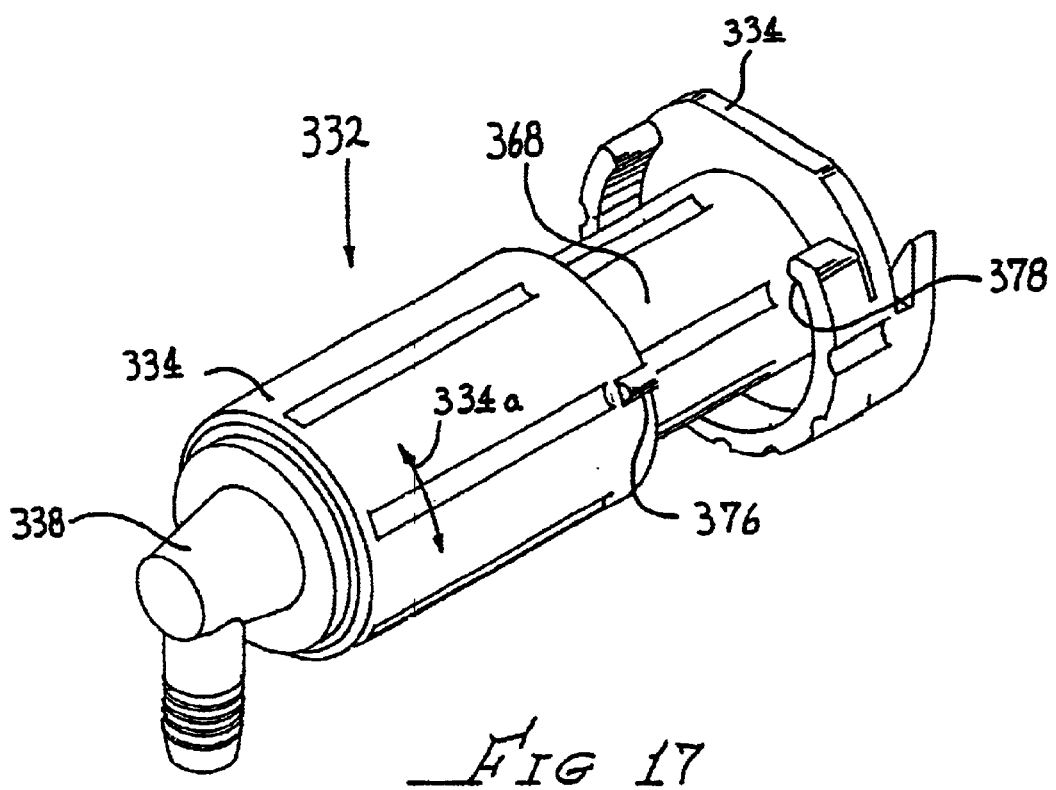

FIG. 9 provides a perspective and somewhat schematic view of a fluid dispensing system with a portion of a cardboard box part broken away for clarity of illustration, and including a fluid-filled bag connecting to a fluid conduit via a connector assembly according to a second embodiment of the invention;

FIG. 10 provides a fragmentary perspective view, partially in cross section, of a female connector part carried on the container seen in FIG. 9;

FIG. 11 is a perspective view of the male connector part seen in FIG. 9, and is presented at an enlarged size for clarity of illustration;

FIG. 12 provides an exploded perspective view of the male connector part embodying the present invention;

FIG. 13 is a longitudinal cross sectional view of the male connector mounted to but not engaged with a female connector member, with the female connector member in its closed position;

FIG. 14 provides a fragmentary cross sectional view showing a male connector part mounted to and engaged with the female connector part so that both the male and female connector parts are opened, and fluid may flow between these connector parts;

FIG. 15 is similar to FIG. 13, and illustrates an alternative embodiment of a male connector part mounted to but not engaged with a female connector part;

FIG. 16 is similar to FIG. 14, and illustrates the alternative embodiment of the male connector part coupled to a female connector part so that both the male and female connector parts are opened and fluid may flow between these connector part;

FIG. 17 provides a perspective view of the male connector part as is seen in FIG. 16; and FIG. 18 provides a perspective view of the male connector part as is seen in FIG. 15.

DETAILED DESCRIPTION OF SEVERAL EXEMPLARY PREFERRED EMBODIMENTS OF THE INVENTION

Figure 1:
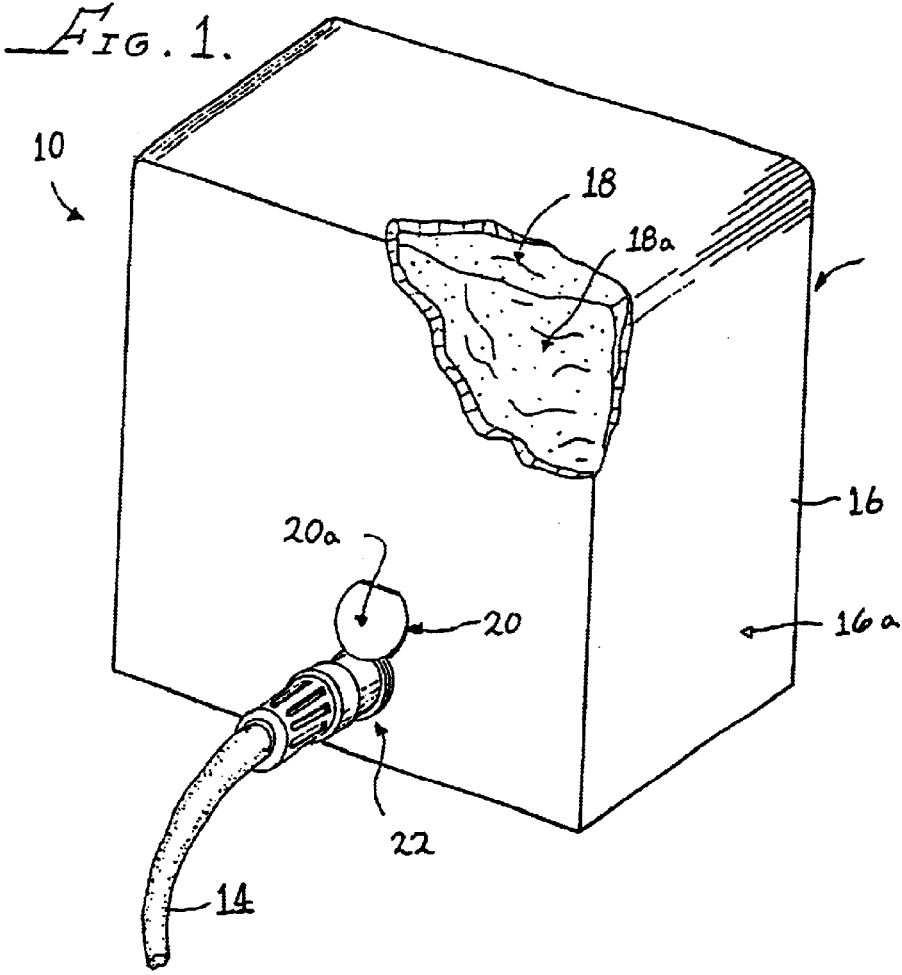

A fluid dispensing system 10 is schematically depicted in FIG. 1. In general and according to the exemplary preferred embodiment of this invention, but without limitation, this fluid dispensing system 10 includes a liquid-filled vessel or container 12, which may be connected to a dispensing pump (not shown) by a conduit 14. The container 12 may be of any desired construction, but the illustrated container is of the bag-in-box configuration. Thus, the container 12 includes an outer shape-retaining box 16, which in the illustrated embodiment is formed of corrugated paperboard, and an inner flexible bag 18 (only a portion of which is visible in FIG. 1) which preferably is fabricated of plastic sheet.

Figure 2:
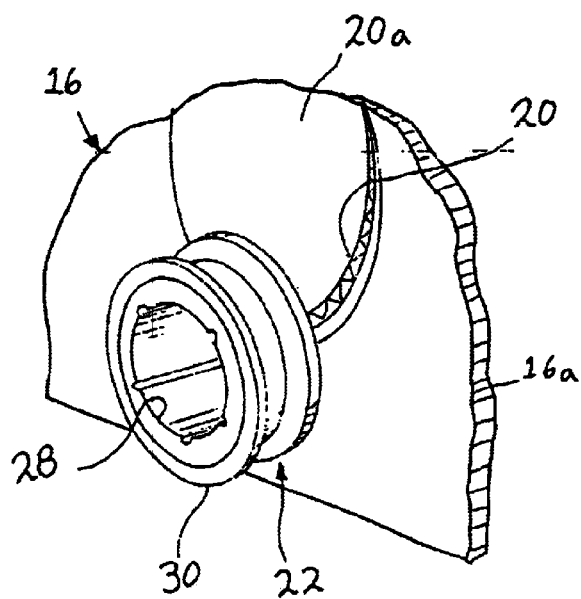

Viewing FIGS. 1–6 in conjunction with one another, and viewing first FIG. 2 in particular, this Figure illustrates that a side wall 16a of the box 16 defines a keyhole-shaped cutout 20. This cutout 20 allows a female coupling part 22, which is mounted to and communicates with the interior space of bag 18, to be extended partially outwardly through this cutout 20. Once the female coupling part is extended from within the box 16 partially outwardly through the cutout 20, it is there retained in a lower extent of the cutout 20 by the cooperation of a pair of axially spaced apart flanges 22a and 22b on the coupling part 22 (best seen in FIG. 5). These spaced apart flanges 22a and 22b capture between them a portion of the wall 16a of box 16 at each side and around the bottom of cutout 20. The female coupling part 22 is itself trapped in the lower extent of the cutout 20 by a keyhole-shaped portion 20a of the box wall 16a (viewing FIGS. 1 and 2). As is also best seen in FIGS. 1 and 2, the keyhole-shaped portion 20a is hingably attached at its upper extent to the wall 16a of the box 16. Consequently, the keyhole-shaped portion 20a may be manually hinged out of the way while the female coupling part 22 is introduced into and is slid downwardly along cutout 20 into the lower extent of this cutout. After the female coupling part 22 is in the lower extent of cutout 20, manual return of the keyhole-shaped portion 20a to the position seen in FIGS. 1 and 2 retains the female coupling part 22 in the cutout 20 of the wall 16a.

It is seen further in FIG. 5 that the female coupling part 22 defines an axially extending fluid flow passage 22' and has an inner flange 24 to which the wall 18a of bag 18 is sealingly secured (i.e., at an opening of this bag). Consequently, the female coupling part 22 provides access to the interior volume of the bag 18 and container 12. That is, the liquid contents of the bag 18 communicate with the female coupling part 22, and may flow outwardly via this coupling part. The container 12 and the female coupling part 22 are conventional. Thus, without further explanation than that provided herein, it will be understood by those ordinarily skilled in the pertinent arts that the female coupling part 22 includes a removable plug member 26 (seen in FIG. 5). This plug member 26 is seen in FIG. 5 removably closing a flow path or passage 28 through the female coupling part 22. At its distal end (i.e., furthest from the box 16) the female coupling part 22 includes a radially outwardly extending mounting flange 30. This mounting flange 30 provides for mounting of a male coupling part 32 to the female coupling part 22. This mode of mounting a male coupling part to the conventional female coupling part 22 will be familiar from the conventional teaching of the '298 patent referenced above. Thus, it will be understood that the illustrated and described mode of mounting of the male coupling part to the female coupling part is exemplary only, and is not limiting of the present invention.

FIGS. 3, 4, 5, and 6 in conjunction with one another illustrate one embodiment of a male coupling part 32 embodying the present invention, which is also seen in FIG. 1 mounted to the female coupling part 22 in order to connect the conduit 14 in fluid flow communication with the liquid within the bag 18 of container 12. In FIG. 3, the male coupling part 32 is seen from a perspective similar to that of FIG. 1, which provides a good view of a rotational manual actuator or handnut portion 34 of this male coupling part. As is represented by the double-headed rotation arrow 34a adjacent to the handnut 34 in FIG. 3, this handnut portion 34 is rotational relative to the remainder of the male coupling part 32, and is effective (as will be explained) to insert and withdraw a male probe portion 36 (best seen in FIGS. 5 and 6) of the male coupling part 32 into and from the female coupling part 22, dependent upon the direction of rotation of the handnut portion 34 relative to the remainder of the male coupling part 32. It will be noted that the male probe portion 36 defines an axially extending passage 36', which is a part of the fluid flow path of the male coupling portion 32, and which aligns axially with the passage 22' of the female coupling portion 22.

Also seen in FIG. 3 is a rearwardly extending hose barb portion 38 of the male probe portion 36, and a fragmentary portion of a nut member 40, having a plurality of resilient fingers 40a engaging at a distal end portion of these fingers into a circumferential groove 42 of the male probe portion 36. This nut member 40 is effective to move the male probe portion 36 axially (i.e., into and from the female coupling part 22) in response to rotation of the handnut member 34 (recalling arrow 34a), as will be explained below.

As is seen in FIGS. 4, 5, and 6, (and viewing FIG. 4 in particular) both the manually rotational actuator portion 34 (i.e., the handnut 34) and the male coupling portion 36 are movably carried on an elongate guide portion 44 of the male coupling part 32. This elongate guide portion 44 both carries the actuator member 34 for relative rotation, and also carries the male probe portion 36 for relative axial movement. In order to provide for the male coupling portion to mount in axial alignment to the female coupling portion, the guide portion 44 at a forward end surface 44a defines means (indicated with arrowed numeral 44b) for removably mounting to the female coupling part 22. This mounting means 44b in the exemplary embodiment provides for coaxial alignment of the male and female coupling parts 32 and 22, and also provides for immobilization of these coupling parts (i.e., with respect to relative axial movement). In other words, the mounting means 44b both prevents relative axial movement of the coupling parts 22 and 32 while the male probe portion 36 enters and withdraws from the female coupling part 22, and reacts axial forces between these coupling parts.

In the illustrated exemplary embodiment, the mounting means 44b includes a forward wall portion 44c of the guide member 44, which wall carries a crescent-shaped flange 44d defining a radially inwardly opening groove 44e. The groove 44e receives the mounting flange 30 of the female coupling part 22, and traps this flange against the surface 44a. Thus, axial relative movements of the coupling parts are prevented.

The male coupling part 32 also includes mechanization for translating rotational relative motion of the actuator member 34 into relative axial motion of the male probe portion 36. In order to provide for relative rotation of actuator member 34 on the guide portion 44, this guide portion defines a pair of elongate, axially extending arcuate tangs 46, defining between them both an axially extending passage 46', and a pair of elongate axially extending guide slots 48. Each of the pair of tangs 46 includes a pair of side surfaces 46a and 46b, which bound the guide slots 48, and a radially outwardly disposed arcuate surface 46c. The nut member 40 includes an annular portion 50, from which axially extends the plurality of fingers 40a, and radially from which extends a diametrically opposed pair of protrusions 52. At their radially outer surfaces 52a, the protrusions 52 each define a respective circumferentially interrupted thread portion 54. These thread portions 54 are at diametrically opposed locations, viewing FIGS. 5 and 6. The thread portions 54 are in effect axially and circumferentially extending helical rib portions defined on the radially outer surfaces 52a of the protrusions 52. Actuator member 34 includes an annular end wall portion 34b against which the nut member 40 is engageable to define one extreme of axial relative movement for this nut member (and for the male probe portion 36).

The actuator member 34 is rotationally carried on the surfaces 46c of the tangs 46, and defines a radially inwardly disposed helical groove (i.e., a female thread) 56. As will be appreciated from consideration of FIGS. 5 and 6, the female thread within the actuator 34 is provided in the form of a double-start thread, so that a pair of the grooves 56 are presented at diametrically opposite locations. The thread portions 54 of the nut member 40 are threadably received into the threads 56 of the actuator 34. In order to provide axially location for the actuator member 34 on the guide portion 44, this guide portion includes in the present embodiment, a radially outer reentrant collar portion 58 cooperating with the remainder of the guide portion to define an axially disposed groove 60. The actuator member 34 has a cylindrical end portion 34c which is rotationally received into the groove 60. Within the groove 60, the collar portion 58 defines a circumferentially continuous radially inwardly disposed groove 62, and the portion 34c of actuator 34 includes a radially outwardly disposed circumferential rib 64. The rib 64 is movably received into groove 62 to axially locate the actuator 34 while allowing relative rotation of this actuator portion (i.e., in the nature of a hand nut). As is seen in the drawing figures, the actuator 34 is preferably provided with surface features (such as ribs, grooves, stippling, diamond pattern, knurling, etceteras) which provide for more effective manual grasping of the actuator portion 34. Further, it will be noted that the collar portion 58 has similar surface treatment features on a radially outward surface portion 58a thereof. Thus, the collar portion 58 may be manually grasped if necessary in order to provide a torque balance on the male coupling part 32 allowing the actuator 34 to be manually relatively rotated without the male coupling part rotating relative to the female coupling part during insertion or withdrawal of the male probe portion 36.

As is seen in FIG. 5, the male coupling part 32 may be mounted to the female coupling part 22, and the actuator member 34 may then be manually rotated relative to the guide portion 44 so that the male probe portion 36 is axially moved from the first position seen in FIG. 5 by action of the thread portions 54 of nut member 40 acting in thread 56 of the actuator member 34. The nut member 40 is thus moved axially, while the protrusions 52 are guided along slots 48, with the fingers 40a transferring axial force to the male probe portion 36. The result is that the male probe portion 36 moves axially relatively to the guide portion 44 (and relative to the female coupling part 22) from the position seen in FIG. 5 to that position seen in FIG. 6. It is noted in FIG. 6, that a sealing sleeve 66 carried on the male probe portion 36 includes an outwardly extending flange portion 66a, which engages the end wall 44c of the guide portion 44. Thus, as the male probe portion 36 is advanced through the annular wall 44c, the sleeve 66 is relatively retracted to uncover fluid flow ports 68. This opening of the male coupling part is not dependent upon the male coupling part being engaged with a female coupling part, and may be employed to clean the male coupling part, if desired.

However, as is seen in FIG. 6, when the male coupling part 32 is mounted to a female coupling part, and the actuator 34 is relatively rotated to advance the male probe portion 36, then this male probe portion at a head feature 70 thereof engages into the plug member 26 of the female coupling part. This engagement of the head feature is effective with further forward movement of the male probe portion 36 (i.e., because of continued relative rotation of the actuator member 34) to carry the plug member 26 inwardly of the bag 18, thus opening the flow passage 28. It will be understood that relative rotation of the actuator 34 in the opposite direction is effective to return the male and female coupling parts from their conditions seen in FIG. 6 to the conditions of FIG. 5. As the male probe portion 36 is withdrawn from the female coupling part 22, a spring 66b is effective to move sleeve 66 once again across ports 68, closing these ports. As will be understood, in the conditions of the male and female coupling parts seen in FIG. 5, the male coupling part maybe dismounted from the female coupling part by lateral relative movement (i.e., removing the mounting flange 30 from within the crescent shaped flange 44d and groove 44e of the guide portion 44—recalling the description above of FIG. 4).

FIGS. 7 and 8 depict a second embodiment of the invention. In order to provide reference numerals for use in describing this alternative embodiment of the invention, features which are the same as (or which are analogous in structure or function to) those features depicted and described above, are referenced in FIGS. 7 and 8 with the same numeral used above, and increased by one-hundred (100). As can be seen it FIGS. 7 and 8 the rotary actuator (i.e., handnut 134) is not axially relatively immovable while being rotated, as was the actuator handnut 34 in the first embodiment. Rather, as this handnut 134 is rotated it also moves axially forward or backward along the guide portion 144 depending of the direction of relative rotation. As the handnut 134 is moved rotationally and axially it effects simultaneous axial movement of the nut member 140 and of the male probe portion 136 by cooperation of the nut member 140 between a pair of axially spaced apart and radially inwardly extending flanges 72 defined by an inner tubular portion 74 of the actuator member 134. That is, although the so-called nut member 140 serves as a thrust collar, it has no real function in this embodiment as a "nut."

An alternative embodiment of a fluid dispensing system of bag-in-box configuration is schematically depicted in FIG. 9. In order to obtain reference numerals for us in describing this embodiment of the invention, features which are the same as or analogous in structure or function to features of the first-described embodiment are indicated using the same numeral used above, and increased by two-hundred (200). In general, this fluid dispensing system 210 includes a liquid-filled vessel or container 212, which may be connected to a dispensing pump (not shown) by a conduit 214. The container 212 may be of any desired construction, but the illustrated container is of the bag-in-box configuration with an outer shape-retaining box 216, which in the illustrated embodiment is formed of corrugated cardboard, and an inner flexible bag 218 (only a portion of which is visible in FIG. 1). Preferably, the bag 218 is fabricated of plastic sheet.

Viewing FIGS. 9–14 in conjunction with one another, and viewing first FIG. 10 in particular, this Figure illustrates that a side wall 216a of the box 16 defines a keyhole-shaped cutout 220. This cutout 220 allows a female connector part 222, which is mounted to and communicates with the interior space of bag 218, to be extended partially outwardly through this cutout 220. Once the female connector part 222 is extended from within the box 216 partially outwardly through the cutout 220, it is there retained in a lower extent of the cutout 220 by the cooperation of a pair of axially spaced apart flanges 222a and 222b on the connector part 222 (best seen in FIG. 13). These spaced apart flanges 222a and 222b capture between them a portion of the wall 216a of box 216 at each side and around the bottom of cutout 220. The female connector part 222 is itself trapped in the lower extent of the cutout 220 by a keyhole-shaped portion 220a of the box wall 216a (viewing FIGS. 9 and 10). As is also best seen in FIGS. 9 and 10, the keyhole-shaped portion 220a is hingably attached at its upper extent to the wall 216a of the box 216. Consequently, the keyhole-shaped portion 220a may be manually hinged out of the way while the female connector part 222 is introduced into and is slid downwardly along cutout 220 into the lower extent of this cutout. After the female connector part 222 is in the lower extent of cutout 220, manual return of the keyhole-shaped portion 220a to the position seen in FIGS. 9 and 10 retains the female connector part 222 in the cutout 220 of the wall 216a.

It is seen further in FIG. 13 that the female connector part 222 has an inner flange 224 to which the wall 218a of bag 218 is sealingly secured (i.e., at an opening of this bag). Consequently, the female connector part 222 provides access to the interior volume of the bag 218 and container 212. That is, the liquid contents of the bag 218 communicate with the female connector part 222, and may flow outwardly via this connector part. It will be understood that the female connector part 222 includes a movable plug member 226 (seen in FIG. 13). This plug member 226 is seen in FIG. 13 removably closing a flow path or passage 228 through the female connector part 222. At its distal end (i.e., furthest from the box 216) the female connector part 222 includes a radially outwardly extending mounting flange 230. This mounting flange 230 provides for mounting of a male connector part 232 to the female connector part 222. That is, as will be seen, the male connector part 232 is moved laterally relative to the female connector part 222 so that a grooved stirrup 232a of the male connector part catches and traps the flange 230. Thus, the male and female connector parts mutually hold one another in axial alignment, and relative axial motion of these connector parts is prevented.

FIGS. 11, 12, 13, and 14 in conjunction with one another illustrate one embodiment of a male connector part 232 embodying the present invention, which is also seen in FIG. 9 mounted to the female connector part 222 in order to connect the conduit 214 in fluid flow communication with the liquid within the bag 218 of container 212. In FIG. 11, the male connector part 232 is seen from a perspective similar to that of FIG. 9, which provides a good view of a rotational manual actuator or handnut portion 234 of this male connector part. As is represented by the double-headed rotation arrow 234a adjacent to the handnut 234 in FIG. 1 this handnut portion 234 is manually rotational relative to the remainder of the male connector part 232, and is effective (as will be explained) to insert and withdraw the forward end portion of a male probe part 236 (best seen in FIGS. 13 and 146) into and from the female connector part 222, dependent upon the direction of manual rotation of the handnut portion 234.

As is seen in FIGS. 13 and 14, the male probe part 236 defines a flow passage indicated with numeral 236'. Also seen in FIG. 11 is an elbow and hose barb member 238 of the male probe portion 236, and a fragmentary portion of a nut member 240, having a plurality of resilient fingers 240a engaging at a distal end portion of these fingers into a circumferential groove 242 of the male probe portion 236 (as is best seen in FIG. 12). This nut member 240 is effective to move the male probe portion 236 axially (i.e., into and from the female connector part 222) in response to rotation of the handnut member 234 (recalling arrow 234a), as will be explained below. The elbow and hose barb member 238 provides for connection of conduit 214 to the male probe portion 236, and also provides for the conduit to resist turning of this male probe portion as the actuator 234 is rotated to effect connecting or disconnecting of the connector parts 222 and 232, as will be seen.

As is seen in FIGS. 12, 13, and 14, (and viewing FIG. 12 in particular) both the manually rotational actuator portion 234 (i.e., the handnut 234) and the male connector portion 236 are movably carried on a guide portion 244 of the male connector part 232. This guide portion 244 rotationally carries the actuator member 234 for relative rotation, and carries the male probe portion 236 for relative axial movement. At its forward surface 244a, the guide portion 244 defines the stirrup 232a for mounting to the female connector part 222. As was pointed out above, this stirrup 232a provides for coaxial alignment of the male and female connector parts 232 and 222, and for relative axial immobilization of these connector parts. In other words, the stirrup 232a captures the flange 230, holds the connector parts 222 and 322 in axial alignment, and restricts relative axial movement of the connector parts 222 and 232 while the male probe portion enters and withdraws from the female connector part.

In the illustrated embodiment, the guide portion 244 includes a forward wall portion 244b, which defines the surface 244a and carries the crescent-shaped stirrup 232a. This stirrup 232a defines a radially inwardly opening groove 244c for laterally receiving the mounting flange 230 of the female connector part 222. It will be noted that the guide portion 244 defines a forward, centrally located opening 244d, through which the forward portion 236a of the male probe portion 236 extends in order to engage with the female connector part 222, viewing FIG. 12.

The male connector part 232 also includes mechanization for translating rotational relative motion of the handnut 234 into relative axial motion of the male probe portion 236. In order to provide for relative rotation of the handnut 234 on the guide portion 244, this guide portion defines a collar part 246 defining a radially inwardly disposed circumferential groove 248. A forward portion 234b of the actuator 234 defines a radially outwardly disposed circumferential rib 250. The rib 250 is rotationally captured in the groove 248, so that the actuator 234 is rotationally carried on the guide portion 244. The nut member 240 includes an annular portion 240b, from which axially extends the plurality of fingers 240a, and radially outwardly from which extends a diametrically opposed pair of angulated thread sections 252.

The actuator member 234 is rotationally carried by the guide member 244, and defines a radially inwardly disposed double-start female thread) 254. The thread sections 252 of the nut member 240 are threadably received into the thread 254 of the actuator 234. As is seen in the drawing figures, the actuator 234 is preferably provided with surface features (such as ribs, grooves, stippling, a raised diamond pattern, knurling, etcetera) which provide for more effective manual grasping of the actuator 234.

As is seen in FIG. 13, the male connector part 232 may be mounted to the female connector part 222, and the actuator member 234 may then be manually rotated relative to the guide portion 244 so that the male probe portion 236 is axially moved (i.e., by action of thread sections 252 in double-start female thread 254) from the first position seen in FIG. 13 toward and then to the second position seen in FIG. 14. The nut member 240 is thus moved axially of the male connector part, with the fingers 240a transferring axial force to the male probe portion 236. The result is that the male probe portion 236 moves axially relatively to the guide portion 244 (and relative to the female connector part 222) from the position seen in FIG. 13 to that position seen in FIG. 14.

It is noted in FIG. 14, that a sealing sleeve 258 carried on the male probe portion 236 includes an outwardly extending flange part 258a. This flange part 258a encounters the wall portion 244b of the guide portion 244 and is thus prevented from further forward axial motion as the male probe portion 36 advances into the female connector part 222. The result is that fluid flow ports 260 of the male probe portion 236 are uncovered. As the male probe portion 236 continues forwardly into the female connector part (considering the change in relative positions of component parts from FIG. 13 to FIG. 14), a head portion 262 of the male probe portion 236 encounters and is received into a recess 264 defined in plug member 226. The head portion 262 is a "snap" fit into the recess 264, so that the plug member 226 is retainingly but removably attached to the head portion 262.

Further, it is to be noted that the opening of the male connector part 232 is not dependent upon the male connector part being engaged with a female connector part 222. Thus, the actuator 234 may be manually rotated in the appropriate direction even though the male connector part 232 is not connected to a female connector part, with the result that the male probe portion 236 is extended forwardly of the guide member 244. In this position of the male probe portion 236, the ports 260 are uncovered by sliding of the sealing sleeve 258 rearwardly to uncover these ports.

However, as is seen in FIG. 14, when the male connector part 232 is mounted to a female connector part, and the handnut 234 is relatively rotated to advance the male probe portion 236, then this male probe portion at a head feature 270 thereof engages into the plug member 226 of the female connector part. This engagement of the head feature is effective with further forward movement of the male probe portion 236 (i.e., because of continued relative rotation of the handnut 234) to carry the plug member 226 inwardly of the bag 218, thus opening the flow passage 228.

It will be understood that relative rotation of the actuator 234 in the opposite direction is effective to return the male and female connector parts from their positions seen in FIG. 14 to the relative positions of FIG. 13. As the male probe portion 236 is withdrawn from the female connector part 222, a spring 258b is effective to move sleeve 258 once again across the ports 260, closing the flow path 236' in male probe portion 236. Once the male probe portion 236 is withdrawn from within the female connector part 222, the male connector part 232 can be moved laterally to dismount from the female connector part at flange 230 (i.e., removing the mounting flange 230 from within the crescent stirrup 232a–recalling the description above of FIG. 12).

FIGS. 15, 16, 17, and 18 depict another embodiment of the invention. In order to provide reference numerals for use in describing this alternative embodiment of the invention, features which are the same as (or which are analogous in structure or function to) those features depicted and described above, are referenced in these Figures with the same numeral used above, and increased by three-hundred (300). As can be seen it FIGS. 15–18, in this embodiment, the rotary handnut 334 is not axially relatively immovable on a guide member of the male connector part while being manually rotated, as was the handnut 34 in the first embodiment. Rather, as this handnut 334 is rotated it also moves axially forward or backward along the guide portion 344 (i.e., depending of the direction of relative rotation). As the handnut 334 is moved rotationally and axially it effects simultaneous axial movement of a cup member 340 and of the male probe portion 336 by cooperation of the cup member 340 which defines a pair of radially outwardly disposed keys 366. The handnut 334 includes an inner tubular portion 368 which at its inner distal end defines an axially disposed thrust surface 368a. This thrust surface

368a engages the cup member 340 to move this member axially rightwardly, viewing FIGS. 15 and 16, in response to rightward axial movement of the handnut 334. This relationship of the cup member 340 and the inner tubular portion 368 of actuator 334 allows the cup member to not rotate as actuator 134 is manually rotated, and to transfer axial forces to the male probe portion 336. On the other hand, when the handnut 334 is manually rotated in the opposite direction, and moves in the opposite axial direction along the guide member 344, the handnut applies an opposite axial force to the male probe portion via an axially disposed thrust surface 334c. This thrust surface 334c bears against the elbow and hose barb member 338 to move the male probe member 336 in the opposite axial direction relative to the guide member 344.

In this embodiment, the guide portion 344 includes a tubular extension 344a with a radially outwardly disposed thread 370. The actuator portion 334 defines a matching female thread 372, which threadably engages onto the thread 370. Also in this embodiment, the tubular extension 344a defines a stepped bore 374, having a slightly larger diameter bore portion (indicated by arrowed numeral 374a. The sealing sleeve 358 is provided with a radially outwardly extending, somewhat flexible web part 358c (i.e., an outer portion of flange 358a), which web part is flexible enough to pass through the smaller diameter portion of bore 374, and into the bore portion 374a. There in the larger diameter bore portion 374a, the somewhat flexible web part 358c moves freely axially, but resists axial withdrawal from this bore portion. Thus, when the actuator 334 is manually turned from the position seen in FIG. 13 and toward the position seen in FIG. 14, the user experiences a "stop" in the free movement of the actuator when the web part 358c engages an axially disposed step 374b presented at the end of bore portion 374a.

Of course, should the user wish to disassemble the connector part 332, then continued forceful turning of the actuator 334 in the same direction (i.e., in the direction necessary to move the handnut member 334 from the position of FIG. 13 toward that of FIG. 14) will force the flexible web 358c past this step 374b, and allow the actuator 334 to be unthreaded completely from the guide portion 344. Once the actuator 334 is unthreaded from the guide portion 344, the male probe portion 336 can be manually withdrawn from within the guide portion for inspection and cleaning.

FIGS. 17 and 18 also illustrate another feature of this embodiment of the invention. In FIG. 17, it is seen that the handnut member 334 defines a pair of diametrically opposite and radially outwardly extending protrusions 376 (only one of which is visible in FIG. 17) on the forward portion 334b of this member. The guide member 344 defines a radially inwardly extending yieldable catch protrusion 378. As FIG. 18 shows, when the handnut 334 is fully rotated in the direction to move the handnut 334 and male probe portion 336 forwardly, one of the protrusions 376 passes under the catch protrusion 378. The catch protrusion 378 yields radially momentarily to allow the particular protrusion 376 to pass circumferentially to the position seen in FIG. 18, where this protrusion 376 is trapped by catch protrusion 378. Thus, the connector part 322 will not close of its own accord, nor will it close inadvertently due to such influences as vibration. Manual force can release the protrusion 376 from catch protrusion 378, but the connector part 322 will not inadvertently close.

Each of the alternative embodiments of the present invention offer the advantage of making the coupling parts of such low cost that the female coupling part may be thrown away with the disposable bag-in-box container, or with another type of non-recyclable container. Alternately when used with a recyclable container, such as are those made of glass or durable plastic, then when the container is cleaned the female coupling part may be disposed of and a new one inserted in its place. The male coupling part may be taken apart for cleaning and is thus reusable over a period of time with several different female coupling parts on successive containers.

While the present invention has been depicted, described, and is defined by reference to two exemplary and particularly preferred embodiments of the invention, such reference does not imply a limitation on the invention, and no such limitation is to be inferred. The invention is capable of considerable modification, alteration, and equivalents in form and function, as will occur to those ordinarily skilled in the pertinent arts. For example, the present coupling parts can be used with fluids other than food products. These present inventive coupling parts could be used with various liquids, such as chemicals. Photographic chemicals are an example of a liquid other than a food product with which the present coupling parts could be used. Also, the present coupling invention can be used with other types of vessels and containers in addition to those depicted, described, or referred to specifically herein. For example, bag type vessels can be used with the present coupling parts even if the bag is not disposed in a box. The present coupling parts have a special advantage is such a use because the male and female coupling portions can be engaged with one another in response to a lateral relative movement and with little applied force. Thereafter, coupling of the male and female coupling structures requires the application of manual rotating forces of rather a low level. In other words, even those individuals of rather low hand strength will be able to apply sufficient relative twisting force to the male coupling member of the present invention so that engagement and disengagement of this male coupling part is easily accomplished. Consequently, an ease of use of a male and female coupling system of the present type which was not heretofore achievable is provided by the present invention. The present coupling portions can also be used to effect fluid communication between a pair of conduits or a pair of vessels, for example, instead of just between a vessel and a conduit as depicted. Thus, it is appreciated that the depicted and described preferred embodiment of the invention is exemplary only, and is not exhaustive of the scope of the invention. Consequently, the invention is intended to be limited only by the spirit and scope of the appended claims, giving full cognizance to equivalents in all respects.

We claim:

1. A male coupling portion of the type configured for use with a female coupling portion to form a fluid-flow coupling structure, each of the male and female coupling portions defining a respective fluid flow path and being removably engageable with one another to communicate the respective fluid flow paths, each coupling portion including a respective valve element having a respective closed first position closing the respective fluid flow path from ambient, said respective valve elements moving to respective open second positions when said coupling portions are engaged together to communicate said fluid flow paths with one another, said male coupling portion comprising:

a guide structure including support means for supportingly and releasably engaging onto the female coupling portion;

said guide structure including structure for guiding a male probe portion in reciprocation between a first position disengaged from the female coupling portion and a second position in which said male probe portion is engageable into the female coupling portion when said coupling portions are engaged together, wherein said guide structure includes a pair of diametrically opposite axially extending and arcuate guide tangs;

said male probe portion reciprocable on said guide structure and carrying said respective valve element of said male coupling portion, and said guide structure and respective valve element including cooperating structure for moving said respective valve element to its open second position in response to reciprocation of said male probe portion to its said second position;

an actuator rotationally carried upon said guide structure, said actuator and said male probe portion defining cooperating structure for reciprocating said male probe portion between its said first position and its said second position in response to rotation of said actuator.

2. The male coupling portion of claim 1 wherein said pair of axially extending arcuate guide tangs cooperatively define a substantially circular passage slidably receiving said male probe portion.

3. The male coupling portion of claim 1 wherein said cooperating structure of said guide structure and respective valve element for moving said respective valve element to its open second position in response to reciprocation of said male probe portion to its said second position includes said respective valve element being of generally tubular configuration and being slidably received on said male probe portion, said valve element further defining a radially outwardly extending flange engaging said guide structure upon reciprocation of said male probe portion to its second position.

4. The male coupling portion of claim 1 wherein said respective valve member of said male coupling portion includes a sealing sleeve member which is slidably carried on said male probe portion, said male probe portion defining an axially extending part of said respective fluid flow path of said male coupling portion and also defining an aperture opening laterally outwardly thereon, said sealing sleeve member in said closed first position spanning and closing said aperture, said sealing sleeve member including a radially outwardly extending element engageable with said guide structure upon forward reciprocation of said male probe portion to stop further forward motion of said sealing sleeve member so that said male probe portion continues forward toward said female coupling portion to uncover said aperture.

5. The male coupling portion of claim 1 wherein said pair of axially extending arcuate guide tangs each define a pair of circumferentially opposite and axially extending side edges, each side edge of said pair of arcuate guide tangs being in circumferential confrontation with a side edge of the other of said pair of arcuate guide tangs to define an axially extending slot.

6. The male coupling portion of claim 5 further including said male probe portion carrying a nut member reciprocating with said male probe portion, said nut member including a protrusion extending radially into said axially extending slot and slidably engaging with said circumferentially confronting side edges of said guide tangs to prevent relative rotation of said nut member while allowing axial relative movement.

7. The male coupling portion of claim 6 wherein said cooperating structure of said actuator and said male probe portion includes said protrusion carrying a section of interrupted male thread radially outwardly disposed on a radially outer surface of the protrusion, said interrupted thread threadably engaging a female thread defined on an inner surface of said actuator member.

8. The male coupling portion of claim 7, wherein said nut member includes a pair of diametrically opposite protrusions, each of said pair of protrusions carrying a respective one of a pair of interrupted male thread sections, and said actuator member includes a double-start thread engaging each of said pair of interrupted thread sections.

9. The male coupling portion of claim 5 wherein said guide structure and said actuator member further define cooperating structure for allowing relative rotation of said actuator member while preventing axial relative movement.

10. The male coupling portion of claim 9 wherein said cooperating structure of said guide structure and said actuator includes said guide structure defining a radially and circumferentially extending groove, said actuator including a radially and circumferentially extending rib received rotationally into said groove and preventing axial relative movement of said actuator on said guide structure.

11. The male coupling portion of claim 10 wherein said guide structure includes a reentrant collar portion cooperating with a remainder portion of said guide structure to define an axially extending groove, said collar portion defining said radially and circumferentially extending groove of said guide portion.

12. The male coupling portion of claim 5 further including said male probe portion carrying a thrust collar member reciprocating with said male probe portion, said thrust collar member and said actuator member including cooperating structure for transferring axial force therebetween while allowing relative rotation so that said thrust collar moves axially in unison with said actuator member.

13. The male coupling portion of claim 12 wherein said cooperating structure of said thrust collar member and of said actuator includes said thrust collar having a pair of radially outwardly extending protrusions, and said actuator including a pair of axially spaced apart radially extending flanges receiving said protrusions therebetween.

14. The male coupling portion of claim 5 wherein said guide structure and said actuator member further define cooperating structure for allowing relative rotation of said actuator member while simultaneously causing axial relative movement.

15. The male coupling portion of claim 14 wherein said cooperating structure of said guide portion structure and said actuator member includes said guide structure defining a male thread and said actuator including a female thread threadably engaging said male thread so that said actuator moves axially along said guide structure in response to relative rotation to transfer axial force to a non-rotational thrust collar.

16. The male coupling portion of claim 15 wherein said actuator includes a tubular portion received into said axial passage of said guide structure, said tubular portion and thrust collar defining cooperating structure for allowing relative rotation of said actuator member while transferring axial force to said thrust collar.

17. A coupling structure with male and female coupling structure portions each defining a fluid flow path, and each removably engageable with the other to open fluid communication therebetween, and said coupling portions also being disengageable from one another to close communication between each fluid flow path and ambient, each one of the male and female portions of the having a respective movable valve member in a first position closing communication with ambient and in a second position opening communication between the fluid flow paths of the engaged coupling portions, the male coupling portion comprising a guide structure including support structure for releasably engaging onto the female coupling portion so that the fluid flow passages of each coupling portion are axially aligned, said guide structure including structure for guiding a male probe portion in reciprocation between a first position disengaged from the female coupling portion and in which the respective valve member is in its closed first position and a second position in which said male probe portion is engaged into the female coupling portion and both said respective valve members are moved to their opened second positions, the guide structure including a pair of diametrically opposite axially extending and arcuate guide tangs;

said male probe portion being reciprocable on said guide structure and carrying said respective valve element of said male coupling portion, and said guide structure and respective valve element including cooperating structure for moving said respective valve element axially of said male probe portion to its open second position in response to reciprocation of said male probe portion to its said second position relative to said guide structure; and an actuator rotationally carried upon said guide structure, said actuator and said male probe portion defining cooperating structure for reciprocating said male probe portion between its said first position and its said second position in response to rotation of said actuator relative to said guide structure.

* * * * *